United States Patent
Bai et al.

(10) Patent No.: US 8,847,415 B1
(45) Date of Patent: Sep. 30, 2014

(54) LIQUID COMPRESSION MOLDING ENCAPSULANTS

(71) Applicant: Henkel Corporation, Rocky Hill, CT (US)

(72) Inventors: Jie Bai, Aliso Viejo, CA (US); Afranio Torres-Filho, Amherst, MA (US); Kathryn Bearden, Aliso Viejo, CA (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 13/723,336

(22) Filed: Dec. 21, 2012

Related U.S. Application Data

(60) Provisional application No. 61/671,378, filed on Jul. 13, 2012.

(51) Int. Cl.
*H01L 23/29* (2006.01)
*H01L 23/28* (2006.01)
*C09D 163/00* (2006.01)

(52) U.S. Cl.
CPC .............. *C09D 163/00* (2013.01); *H01L 23/29* (2013.01)
USPC ........... 257/791; 257/787; 257/788; 257/790; 257/792; 257/793

(58) Field of Classification Search
USPC .................. 257/791, 787, 788, 790, 792, 793
See application file for complete search history.

(56) References Cited

U.S. PATENT DOCUMENTS

| | | | |
|---|---|---|---|
| 4,477,629 A | 10/1984 | Hefner, Jr. et al. | |
| 4,528,366 A | 7/1985 | Woo et al. | |
| 2009/0236036 A1* | 9/2009 | Miyakawa et al. | 156/247 |
| 2010/0210793 A1* | 8/2010 | Ogawa et al. | 525/423 |
| 2010/0256313 A1* | 10/2010 | Nakamura et al. | 525/476 |
| 2012/0123053 A1* | 5/2012 | Kibayashi et al. | 524/606 |
| 2013/0038839 A1* | 2/2013 | Uehara et al. | 353/20 |

FOREIGN PATENT DOCUMENTS

| | | |
|---|---|---|
| GB | 1305702 | 2/1973 |
| WO | 8502184 | 5/1985 |

\* cited by examiner

*Primary Examiner* — Matthew Reames
*Assistant Examiner* — Dilinh Nguyen
(74) *Attorney, Agent, or Firm* — Steven C. Bauman

(57) ABSTRACT

Thermosetting resin compositions useful for liquid compression molding encapsulation of a silicon wafer are provided. The so-encapsulated silicon wafers offer improved resistance to warpage, compared to unencapsulated wafers or wafers encapsulated with known encapsulation materials.

14 Claims, 1 Drawing Sheet

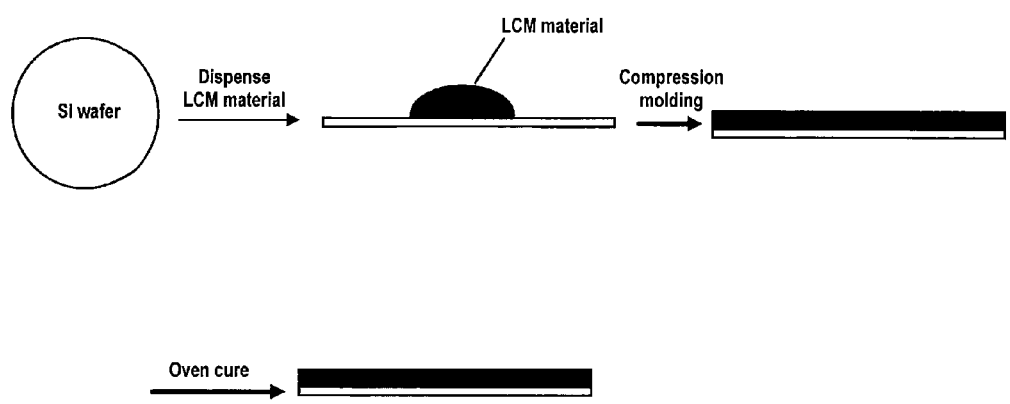

LIQUID COMPRESSION MOLDING ENCAPSULANTS

BACKGROUND

1. Field

Thermosetting resin compositions useful for liquid compression molding encapsulation of a silicon wafer are provided. The so-encapsulated silicon wafers offer improved resistance to warpage, compared to unencapsulated wafers or wafers encapsulated with known encapsulation materials.

2. Brief Description of Related Technology

Liquid compression molding in the semiconductor packaging industry involves the coating of a protective material around and about a silicon wafer, a purpose of the protective material being to provide resistance against warpage of the wafer, particularly with an eye toward subsequent singulation of the wafer into individual die.

Conventional materials used to encapsulate silicon wafers have either not possessed the desired physical properties to offer improved resistance to wafer warpage, or have not lent themselves to application by liquid compression molding techniques.

It would be desirable therefore to provide encapsulation by liquid compression molding to silicon wafers materials suitable for application, which are thermosetting resin compositions capable of providing improved resistance to silicon wafer warpage.

SUMMARY

Thermosetting resin compositions that are capable of reducing, after cure, silicon wafer warpage are provided. More specifically, thermosetting resin compositions useful as liquid compression molding encapsulants having low warpage after compression molding and oven cure, while maintaining the physical properties of a molding compound, in the invention composition are provided. The compositions exhibit low modulus at room temperature (such as about 2,200 MPas or less, desirably within the range of about 100 to about 1,200 Mpa, at 25° C.), and multiple Tgs [$T_{g1}$ about −70° C. to −30° C. (such as −60° C.), and $T_{g2}$ about 100° C. to 150° C. (such as 140° C.)]. This physical property combination shows promise in overcoming some of the significant technical hurdles facing the semiconductor packaging industry at present, particularly with respect to wafer warpage.

Thus provided in one aspect is a thermosetting resin composition, which when cured forms a network of reacted products showing two or more Tg's by Differential Scale calorimetry ("DSC"). The components of these compositions include a curable resin matrix (such as one based on the combination of an epoxy resin component and a (meth)acrylate-functional polymer component), and a cure component comprising a cationic catalyst and an oxidant.

In another aspect, provided is a method of improving warpage resistance to a silicon wafer, steps of which include:

providing a silicon wafer;

providing a thermosetting resin composition as so described in contact with the silicon wafer; and exposing the silicon wafer and the thermosetting resin composition to conditions favorable to allow the thermosetting resin composition to flow about the silicon wafer and cure to a reaction product of the thermosetting resin composition. The cured reaction product is capable of improving warpage resistance of the silicon wafer by about 20%, desirably at least about 50%, and even more desirably at least about 80%, as compared with a silicon wafer either without cured reaction product or with a material other than that which is disclosed herein.

BRIEF DESCRIPTION OF THE FIGURES

FIG. 1 depicts a process flow diagram of a liquid compression molding process.

DETAILED DESCRIPTION

The thermosetting resin compositions as noted above, include among other constituents a curable resin matrix (such as the combination of an epoxy resin component and a (meth) acrylate functional polymer component).

Examples of the epoxy resin component include epoxies made from bisphenol A, bisphenol F, bisphenol S, bisphenol E, biphenyl or combinations thereof. In addition, two or more different bisphenol epoxies (or hydrogenated versus thereof) within the same type of resin (such as A, F, S or E) may be used.

Commercially available examples of the bisphenol epoxies desirable for use herein include bisphenol-F epoxies [such as RE-404-S from Nippon Kayaku, Japan, and EPICLON 830 (RE1801), 830S (RE1815), 830A (RE1826) and 830W from Dai Nippon Ink & Chemicals, Inc., and RSL 1738 and YL-983U from Resolution] and bisphenol-A epoxies (such as YL-979 and 980 from Resolution).

The bisphenol epoxies available commercially from Dai Nippon and noted above are promoted as liquid undiluted epichlorohydrin-bisphenol F epoxies having lower viscosities than conventional epoxies based on bisphenol A epoxies and have physical properties similar to liquid bisphenol A epoxies. Bisphenol F epoxy has a lower viscosity than bisphenol A epoxy, all else being the same between the two types of epoxies, which affords a lower viscosity and thus a fast flow underfill sealant material. The EEW of these four bisphenol F epoxies is between 165 and 180. The viscosity at 25° C. is between 3,000 and 4,500 cps (except for RE1801 whose upper viscosity limit is 4,000 cps). The bisphenol A epoxies have a EEW (g/eq) of between 180 and 195 and a viscosity at 25° C. of between 100 and 250 cps.

The bisphenol epoxies available commercially from Resolution and noted above are promoted as low chloride containing liquid epoxies. The total chloride content for the RSL-1738 bisphenol A epoxy is reported as between 500 and 700 ppm, and that for YL-983U as between 150 and 350 ppm.

Among the epoxies suitable for use herein also include polyglycidyl derivatives of phenolic compounds, such as those available commercially under the tradename EPON, such as EPON 828, EPON 1001, EPON 1009, and EPON 1031 from Resolution; DER 331, DER 332, DER 334, and DER 542 from Dow Chemical Co.; and BREN-S from Nippon Kayaku. Other suitable epoxies include polyepoxides prepared from polyols and the like and polyglycidyl derivatives of phenol-formaldehyde novolacs, the latter of such as DEN 431, DEN 438, and DEN 439 from Dow Chemical. Cresol analogs are also available commercially under the tradename ARALDITE, such as ARALDITE ECN 1235, ARALDITE ECN 1273, and ARALDITE ECN 1299 from Ciba Specialty Chemicals Corporation. SU-8 is a bisphenol-A-type epoxy novolac available from Resolution. Polyglycidyl adducts of amines, aminoalcohols and polycarboxylic acids are also useful in this invention, commercially available resins of which include GLYAMINE 135, GLYAMINE 125, and GLYAMINE 115 from F.I.C. Corporation; ARALDITE MY-720, ARALDITE 0500, and ARALDITE 0510 from Ciba Specialty Chemicals and PGA-X and PGA-C from the Sherwin-Williams Co.

In addition to the bisphenol epoxies, other epoxy compounds may be included within the epoxy component. For instance, cycloaliphatic epoxies, such as 3,4-epoxycyclohexylmethyl-3,4-epoxycyclohexylcarbonate, or hydrogenated versions of the bisphenol or biphenyl epoxies may be used.

Also monofunctional, difunctional or multifunctional reactive diluents to adjust the viscosity and/or lower the Tg are also used, such as butyl glycidyl ether, cresyl glycidyl ether, polyethylene glycol glycidyl ether or polypropylene glycol glycidyl ether. Appropriate monofunctional epoxy coreactant diluents for use herein include those that have a viscosity which is lower than that of the epoxy component, ordinarily, less than about 250 cps.

The monofunctional epoxy coreactant diluents should have an epoxy group with an alkyl group of about 6 to about 28 carbon atoms, examples of which include $C_{6-28}$ alkyl glycidyl ethers, $C_{6-28}$ fatty acid glycidyl esters and $C_{10-28}$ alkylphenol glycidyl ethers.

In the event such a monofunctional epoxy coreactant diluent is included, such coreactant diluent should be employed in an amount of up to about 5 percent by weight to about 15 percent by weight, such as about 8 percent by weight to about 12 percent by weight, based on the total weight of the composition.

The epoxy resin component should be present in the composition in an amount which the range of about 10 percent by weight to about 95 percent by weight, desirably about 20 percent by weight to about 80 percent by weight, such as about 60 percent by weight.

The (meth)acrylate functional polymer component may be chosen from a variety of materials. Examples of such materials include (meth)acrylate functionalized polymers (where here the term polymer includes as well oligomers and elastomers), such as urethanes or polybutadienes. One particularly desirable example is a polybutadiene-dimethacrylate, a commercially available example of which is known as CN 303 from Sartomer Inc., Exton, Pa.

In addition to the epoxy resin component and the (meth) acrylate functional polymer component, other reactive components may be included, such as an episulfide resin component, an oxazine component, such as a benzoxazine component, a cyanate ester component, and/or a maleimide-, a nadimide- or an itaconimide-containing component.

As an episulfide resin, any of the aforementioned epoxies may be used where the oxirane oxygen atom has been replaced by a sulfur atom.

Oxazines may be embraced by the structure

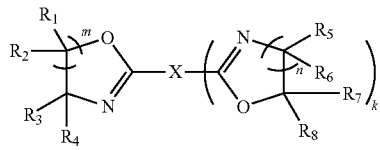

where here $R_1$-$R_8$ are each individually members selected from hydrogen, $C_{1-40}$ alkyl, $C_{2-40}$ alkenyl, the latter two of which being optionally interrupted by one or more of O, N, S, C=O, COO, or NHC=O or substituted by one or more of OH, OR, NRR, SH, SR, COOH, COOR, NHCOOH or NHCOOR, where R is selected from $C_{1-40}$ alkyl, $C_{2-40}$ alkenyl, or $C_{6-20}$ aryl, X is a linkage selected broadly from alkylene, alkenylene, or arylene, optionally interrupted by one or more of O, NR, S, C=O, COO, or NHC=O or substituted by one or more of OH, OR, NRR, SH, SR, COOH, COOR, NHCOOH or NHCOOR, where R is selected from $C_{1-40}$ alkyl, $C_{2-40}$ alkenyl, or $C_{6-20}$ aryl, m and n are each individually 1 or 2, and k is 0 to 6.

The oxazine resin component should be present in the composition in an amount which the range of about 10 percent by weight to about 95 percent by weight, desirably about 20 percent by weight to about 80 percent by weight, such as about 60 percent by weight.

A more specific example of the oxazine resin component is a benzoxazine resin, examples of which may be embraced by

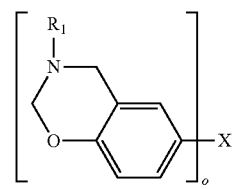

where o is 1-4, X is defined below, and $R_1$ is alkyl, such as methyl, ethyl, propyls or butyls, or

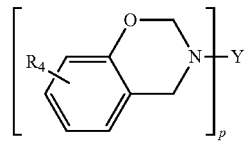

where p is 1-4, Y is defined below, and $R_4$ is selected from hydrogen, halogen, alkyl or alkenyl.

X and Y in the benzoxazine structures above may independently be selected from a monovalent or polyvalent radical that include hydrocarbyl or substituted hydrocarbyl species typically having in the range of about 6 up to about 500 carbon atoms, where the hydrocarbyl species is selected from alkyl, alkenyl, alkynyl, cycloalkyl, cycloalkenyl, aryl, alkylaryl, arylalkyl, aryalkenyl, alkenylaryl, arylalkynyl or alkynylaryl, provided, however, that X can be aryl only when X comprises a combination of two or more different species;

hydrocarbylene or substituted hydrocarbylene species typically having in the range of about 6 up to about 500 carbon atoms, where the hydrocarbylene species are selected from alkylene, alkenylene, alkynylene, cycloalkylene, cycloalkenylene, arylene, alkylarylene, arylalkylene, arylalkenylene, alkenylarylene, arylalkynylene or alkynylarylene, heterocyclic or substituted heterocyclic species typically having in the range of about 6 up to about 500 carbon atoms, polysiloxane, and polysiloxane-polyurethane block copolymers, and combinations of one or more of the above with a linker selected from covalent bond, —O—, —S—, —NR—, —NR—C(O)—, —NR—C(O)—O—, —NR—C(O)—NR—, —S—C(O)—, —S—C(O)—O—, —S—C(O)—NR—, —O—S(O)$_2$—, —O—S(O)$_2$—O—, —O—S(O)$_2$—NR—, —O—S(O)—, —O—S(O)—O—, —O—S(O)—NR—, —O—NR—C(O)—, —O—NR—C(O)—O—, —O—NR—C(O)—NR—, —NR—O—C(O)—, —NR—O—C(O)—O—, —NR—O—C(O)—NR—, —O—NR—C(S)—, —O—NR—C(S)—O—, —O—NR—C(S)—NR—, —NR—O—C(S)—, —NR—O—C(S)—O—, —NR—O—C(S)—NR—, —O—C(S)—, —O—C(S)—O—, —O—C(S)—NR—, —NR—C(S)—, —NR—C(S)—O—, —NR—C(S)—NR—, —S—S(O)$_2$—, —S—S(O)$_2$—NR—, —NR—O—S(O)—, —NR—O—S(O)—O—, —NR—O—S(O)—NR—, —NR—O—S(O)$_2$—, —NR—O—S(O)$_2$—O—, —NR—O—S(O)$_2$—NR—, —O—NR—S(O)—, —O—NR—S(O)—O—, —O—NR—S(O)—NR—, —O—NR—S(O)$_2$—O—, —O—NR—S(O)$_2$—NR—, —O—NR—S(O)$_2$—, —O—P(O)R$_2$—, —S—P(O)R$_2$—, or —NR—P(O)R$_2$—; where each R is independently hydrogen, alkyl or substituted alkyl.

When one or more of the above described "X" or "Y" linkages cooperate to form the appendage of a benzoxazine group, as readily recognized by those of skill in the art, a wide variety of organic chains can be produced, such as, for example, oxyalkyl, thioalkyl, aminoalkyl, carboxylalkyl, oxyalkenyl, thioalkenyl, aminoalkenyl, carboxyalkenyl, oxyalkynyl, thioalkynyl, aminoalkynyl, carboxyalkynyl, oxycycloalkyl, thiocycloalkyl, aminocycloalkyl, carboxycycloalkyl, oxycycloalkenyl, thiocycloalkenyl, aminocycloalkenyl, carboxycycloalkenyl, heterocyclic, oxyheterocyclic, thioheterocyclic, aminoheterocyclic, carboxyheterocyclic, oxyaryl, thioaryl, aminoaryl, carboxyaryl, heteroaryl, oxyheteroaryl, thioheteroaryl, aminoheteroaryl, carboxyheteroaryl, oxyalkylaryl, thioalkylaryl, aminoalkylaryl, carboxyalkylaryl, oxyarylalkyl, thioarylalkyl, aminoarylalkyl, carboxyarylalkyl, oxyarylalkenyl, thioarylalkenyl, aminoarylalkenyl, carboxyarylalkenyl, oxyalkenylaryl, thioalkenylaryl, aminoalkenylaryl, carboxyalkenylaryl, oxyarylalkynyl, thioarylalkynyl, aminoarylalkynyl, carboxyarylalkynyl, oxyalkynylaryl, thioalkynylaryl, aminoalkynylaryl or carboxyalkynylaryl. oxyalkylene, thioalkylene, aminoalkylene, carboxyalkylene, oxyalkenylene, thioalkenylene, aminoalkenylene, carboxyalkenylene, oxyalkynylene, thioalkynylene, aminoalkynylene, carboxyalkynylene, oxycycloalkylene, thiocycloalkylene, aminocycloalkylene, carboxycycloalkylene, oxycycloalkenylene, thiocycloalkenylene, aminocycloalkenylene, carboxycycloalkenylene, oxyarylene, thioarylene, aminoarylene, carboxyarylene, oxyalkylarylene, thioalkylarylene, aminoalkylarylene, carboxyalkylarylene, oxyarylalkylene, thioarylalkylene, aminoarylalkylene, carboxyarylalkylene, oxyarylalkenylene, thioarylalkenylene, aminoarylalkenylene, carboxyarylalkenylene, oxyalkenylarylene, thioalkenylarylene, aminoalkenylarylene, carboxyalkenylarylene, oxyarylalkynylene, thioarylalkynylene, aminoarylalkynylene, carboxy arylalkynylene, oxyalkynylarylene, thioalkynylarylene, aminoalkynylarylene, carboxyalkynylarylene, heteroarylene, oxyheteroarylene, thioheteroarylene, aminoheteroarylene, carboxyheteroarylene, heteroatom-containing di- or polyvalent cyclic moiety, oxyheteroatom-containing di- or polyvalent cyclic moiety, thioheteroatom-containing di- or polyvalent cyclic moiety, aminoheteroatom-containing di- or polyvalent cyclic moiety, carboxyheteroatom-containing di- or polyvalent cyclic moiety, and the like.

The benzoxazine resin component should be present in the composition in an amount which the range of about 10 percent by weight to about 95 percent by weight, desirably about 20 percent by weight to about 80 percent by weight, such as about 60 percent by weight.

As a cyanate ester component, compounds having the general structural formula below may be used:

where here m is from 2 to 5 and R$^1$ is an aromatic nucleus-containing residue. R$^1$ should contain at least 6 carbon atoms and may be derived, for example, from aromatic hydrocarbons, such as benzene, biphenyl, naphthalene, anthracene, pyrene or the like. The aromatic residue may be also be derived from a polynuclear aromatic hydrocarbon in which at least two aromatic rings are attached to each other through a bridging group, such as where the bridging member has the formula

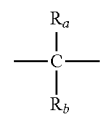

where R$_a$ and R$_b$ are the same or different and each represents a hydrogen atom or an alkyl group containing 1 to 4 carbon atoms. R$^1$ also includes residues derived from novolac-type phenolic resins—i.e. cyanate esters of these phenolic resins. R$^1$ may also contain further ring attached, non-reactive substituents. 1

Examples of useful cyanate esters include, for instance, 1,3-dicyanatobenzene; 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane and 3,3',5,5'-tetramethyl, bis(4-cyanatophenyl)methane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)sulfide; 2,2-bis(4-cyanatophenyl)propane; tris(4-cyanatophenyl)-phosphite; tris(4-cyanatophenyl) phosphate; bis(3-chloro-4-cyanatophenyl)methane; cyanated novolac; 1,3-bis[4-cyanatophenyl-1-(methylethylidene)]benzene and cyanated, bisphenol-terminated polycarbonate or other thermoplastic oligomer.

Other cyanate esters include cyanates disclosed in U.S. Pat. Nos. 4,477,629 and 4,528,366, the disclosure of each of which is hereby expressly incorporated herein by reference; the cyanate esters disclosed in U.K. Patent No. 1,305,702, and the cyanate esters disclosed in International Patent Publication No. WO 85/02184, the disclosure of each of which is hereby expressly incorporated herein by reference.

Particularly desirable cyanate esters for use herein are available commercially from Hunstman Advanced Materials, Tarrytown, N.Y. under the tradename "AROCY" [1,1-di(4-cyanatophenylethane)]. The structures of four desirable "AROCY" cyanate esters are

"AROCY" B-10

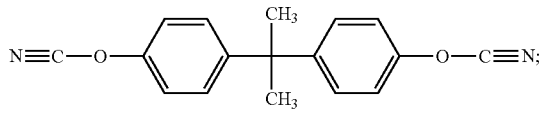

"AROCY" M-30

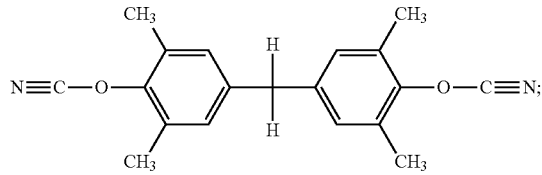

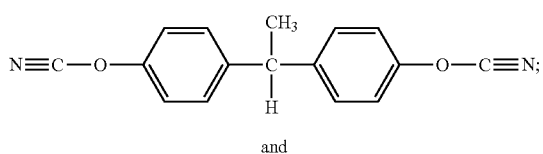
"AROCY" L-10 and

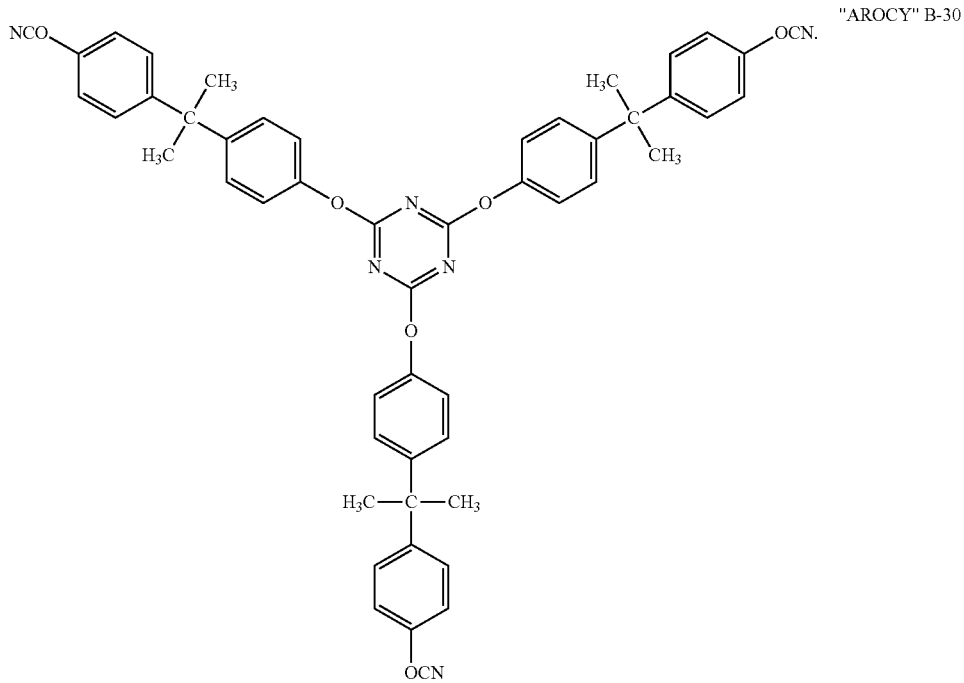
"AROCY" B-30

The cyanate ester resin component should be present in the composition in an amount which the range of about 10 percent by weight to about 95 percent by weight, desirably about 20 percent by weight to about 80 percent by weight, such as about 60 percent by weight.

As a maleimide, nadimide or itaconimide, compounds having the general respective structural formulae below may be used:

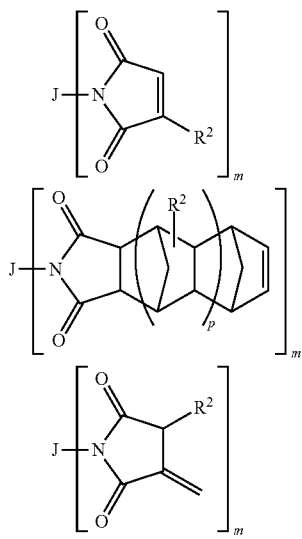

where here m is 1-15, p is 0-15, each $R^2$ is independently selected from hydrogen or lower alkyl (such as $C_{1-5}$), and J is a monovalent or a polyvalent radical comprising organic or organosiloxane radicals, and combinations of two or more thereof, such as are defined as "X" and "Y" with respect to the benzoxazine structure above.

Monovalent or polyvalent radicals include hydrocarbyl or substituted hydrocarbyl species typically having a range of about 6 up to about 500 carbon atoms. The hydrocarbyl species may be alkyl, alkenyl, alkynyl, cycloalkyl, cycloalkenyl, aryl, alkylaryl, arylalkyl, aryalkenyl, alkenylaryl, arylalkynyl and alkynylaryl.

Additionally, X may be a hydrocarbylene or substituted hydrocarbylene species typically having in the range of about 6 up to about 500 carbon atoms. Examples of hydrocarbylene species include but are not limited to alkylene, alkenylene, alkynylene, cycloalkylene, cycloalkenylene, arylene, alkylarylene, arylalkylene, arylalkenylene, alkenylarylene, arylalkynylene and alkynylarylene.

The maleimide, itaconamide or nadimide may be in liquid or solid form.

In a desired embodiment, the maleimide, itaconamide or nadimide functional groups are separated by a polyvalent radical having sufficient length and branching to render the maleimide containing compound a liquid. The maleimide, itaconamide or nadimide compound may contain a spacer between maleimide functional groups comprising a branched chain alkylene between maleimide, itaconamide or nadimide functional groups.

In the case of maleimide-containing compounds, the maleimide compound desirably is a stearyl maleimide, oleyl maleimide, a biphenyl maleimide or a 1,20-bismaleimido-10,11-dioctyl-eixosane or combinations of the above.

Again in the case of maleimide-containing compounds, the maleimide compound may be prepared by reaction of maleic anhydride with dimer amides or prepared from aminopropylterminated polydimethyl siloxanes, polyoxypropylene amines, polytetramethyleneoxide-di-p-aminobenzoates, or combinations thereof.

Particularly desirable maleimides and nadimides include

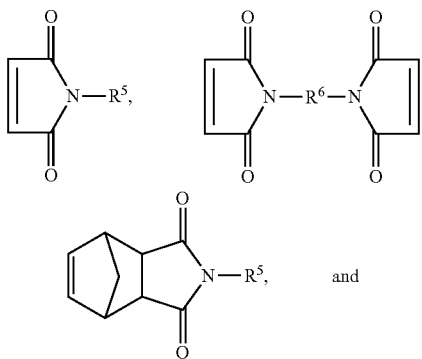

and

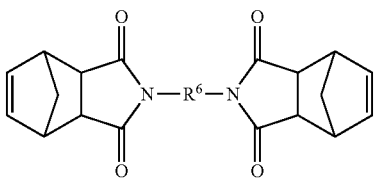

where $R^5$ and $R^6$ are each selected from alkyl, aryl, aralkyl or alkaryl groups, having from about 6 to about 100 carbon atoms, with or without substitution or interruption by a member selected from silane, silicon, oxygen, halogen, carbonyl, hydroxyl, ester, carboxylic acid, urea, urethane, carbamate, sulfur, sulfonate and sulfone.

Other desirable maleimides, nadimides, and itaconimides include

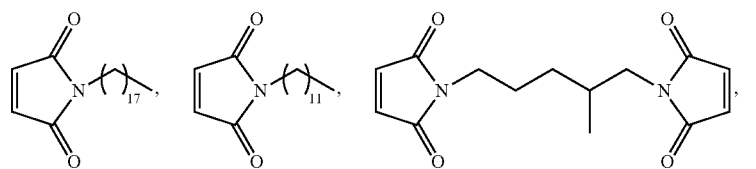

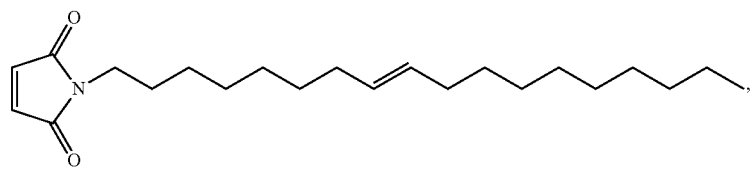

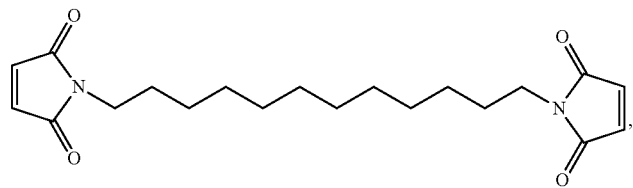

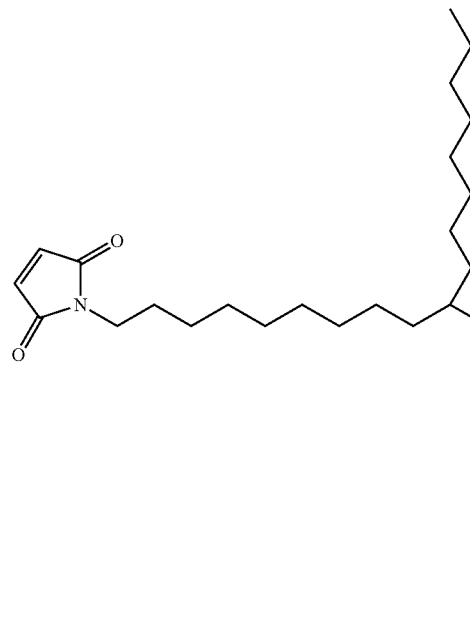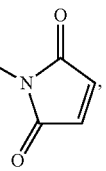

11
12
-continued
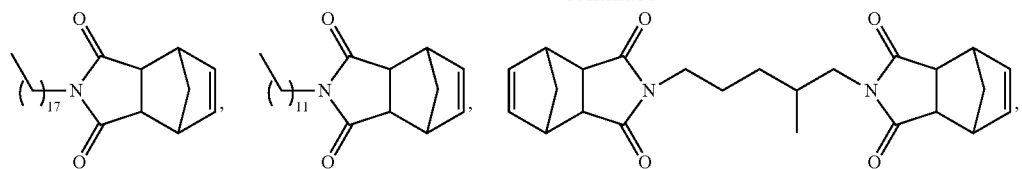
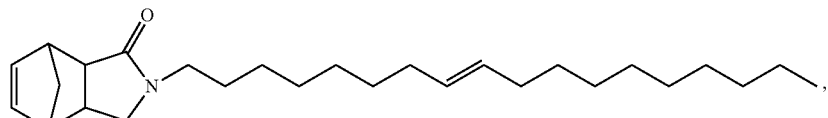
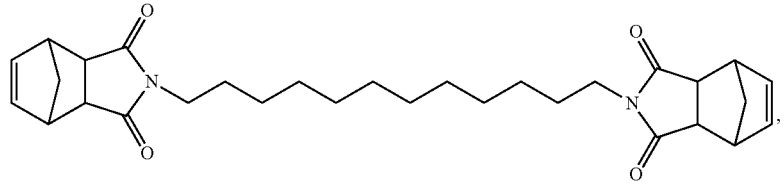
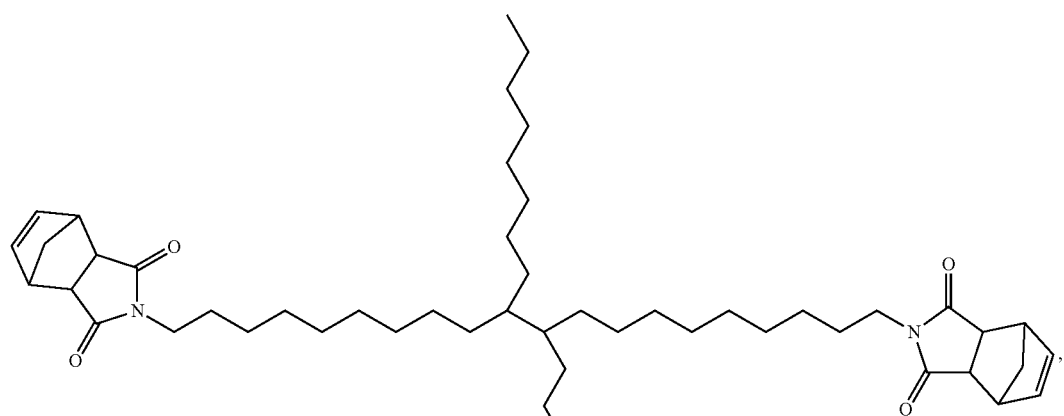
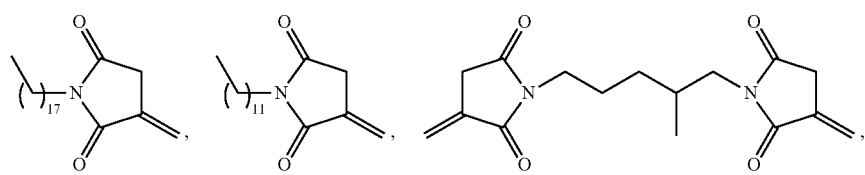
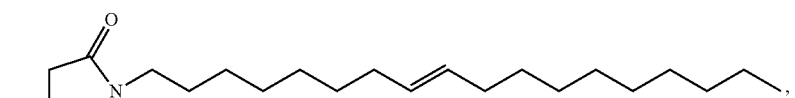
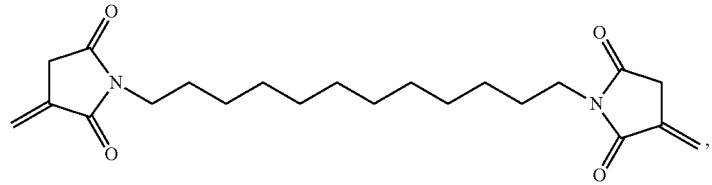

-continued

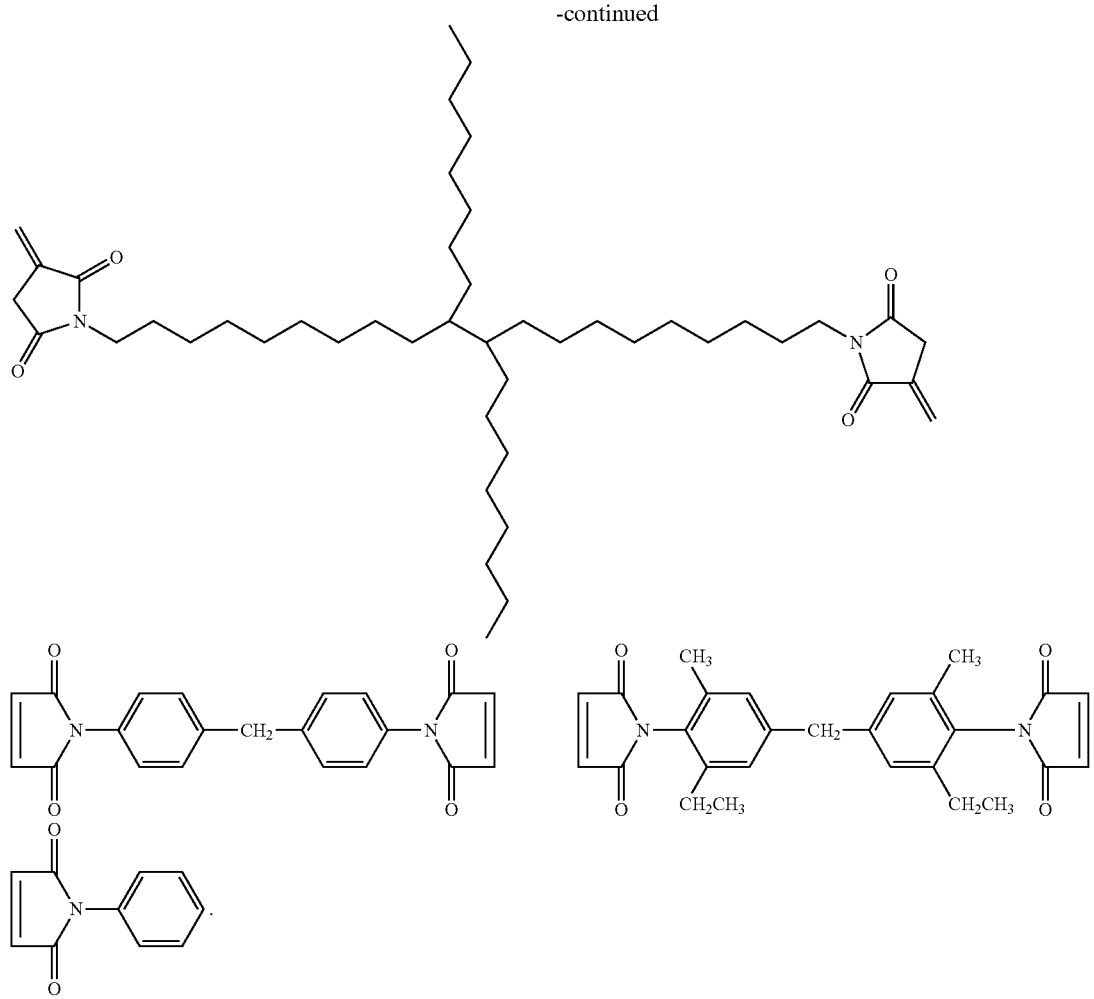

The maleimides, nadimides or itaconimides should be present in the composition in an amount which the range of about 10 percent by weight to about 95 percent by weight, desirably about 20 percent by weight to about 80 percent by weight, such as about 60 percent by weight.

A filler component may also be advantageous from time to time, and in those instances many materials are potentially useful. For instance, inorganic fillers may be useful, particularly where coefficients of thermal expansion ("CTE") between the semiconductor chip and the substrate to be mated and sealed are to be more closely matched. The filler influences the CTE and thus can be used to reduce thermal expansion of the cured material, thereby reducing warpage. The filler component may often include reinforcing silicas, such as fused spherical silicas, and may be untreated or treated so as to alter the chemical nature of their surface. The filler component however should include particles having a mean particle size distribution in the 0.1 to 50 micron range. A commercially available example of such particles is sold by Tatsumori or Denka in Japan. In addition, nano-size silica powder might be added, such as those sold under the tradename NANOPDX by Nanoresins, Germany. NANOPDX fillers are monodisperse silica filler dispersions in epoxy resins, at a level of up to about 50 percent by weight, available from Nanoresins, Germany. NANOPDX fillers ordinarily are believed to have a particle size of about 5 nm to about 80 nm.

Nanoresins also produces materials under the NANOPDX E trade designations. For instance, Nanoresins reports NANOPDX E-brand products enable the complete impregnation of electronic components which are difficult to seal otherwise and provide a large spectrum of mechanical and thermal properties such as reduced shrinkage and thermal expansion, fracture toughness and modulus. In the table below, Nanoresins-provided information on the four noted NANOPDX E products is set forth:

| Type | SiO2 - Content [wt %] | Base resin | EEW [g/eq] | Dyn. viscosity, 25° C. [mPa · s] |
|---|---|---|---|---|
| NANOPDX E 430 | 40 | DGEBA/ DGEBF | 290 | 45,000 |
| NANOPDX E 470 | 40 | DGEBA[1] | 295 | 60,000 |
| NANOPDX E 500 | 40 | DGEBF[2] | 275 | 20,000 |
| NANOPDX E 600 | 40 | EEC[3] | 220 | 4,000 |

[1] diglycidyl ester of bisphenol
[2] diglycidyl ester of bisphenol
[3] 3,4-epoxycyclohexyhnethyl-3,4-epoxycyclohexylcarbonate Nanoresins reports that important properties can be significantly improved in epoxy formulations by using NANOPDX E-brand products. For instance:
- lower viscosity of the formulation in comparison to conventional reinforced fillers
- no sedimentation
- increase in the fracture toughness, impact resistance and modulus
- improved scratch and abrasion resistance
- reduction of shrinkage and thermal expansion
- improvement, or at least no negative effect, in numerous desired properties, such as thermal stability, chemical resistance, glass transition temperature, weathering resistance, and dielectric properties.

The processability is essentially unchanged in comparison to the respective base resin.

According to the manufacturer, NANOPDX E-brand products are a colloidal silica sol in an epoxy resin matrix. The dispersed phase consists according to the manufacturer of surface-modified, spherically shaped $SiO_2$ nanoparticles with diameters below 50 nm and an extremely narrow particle size distribution. These spheres, only a few nanometers in size, are distributed agglomerate-free in the resin matrix. This according to the manufacturer produces a very low viscosity of the dispersion with $SiO_2$ content of up to 40 percent by weight. As reported by the manufacturer, the nanoparticles are chemically synthesized from aqueous sodium silicate solution. In this process the binding agent is not damaged, in contrast to processes in which powdered fillers are dispersed with dissolvers or other equipment using high shear energy.

Other desirable materials for use as a filler component include those constructed of or containing aluminum oxide, silicon nitride, aluminum nitride, silica-coated aluminum nitride, boron nitride and combinations thereof.

The filler component, when used, should be used in an amount of about 50 to about 90 percent by weight of the composition, such as about 60 to about 90 percent by weight, desirably within the range of about 70 to about 90 percent by weight.

As the cure component, many different cationic catalysts can be used depending upon the temperature at which cure is desired to occur. For instance to achieve cure at a temperature in the about 110° C. to about 180° C. range, a variety of materials may be used. Examples of the cationic catalysts include methyl p-toluenesulfonate ("MeOTs") and phenyl-p-octyloxyphenyl-iodonium hexafluorantimonate, available commercially under the trade name UVacure 1600 from Cytec.

The cure component should be present in an amount within the range of about 0.1 percent by weight to about 2.0 percent by weight, desirably about 0.5 percent by weight to about 1.75 percent by weight, of the total composition.

The oxidant ordinarily is a peroxide, examples of which include dicumyl peroxide and tert-amyl peroxy-2-ethylhexanoate, available commercially as Trigonox 121 from Akzo Nobel.

The oxidant should be present in an amount within the range of about 0.05 percent by weight to about 1.5 percent by weight, desirably about 0.2 percent by weight to about 0.75 percent by weight, of the total composition.

The following examples are provided for illustrative purposes.

EXAMPLES

A silicon wafer is ordinarily constructed today to have an 8" or 12" diameter, and a thickness of about 25 um to 300 um. In use, the thermosetting resin composition used to encapsulate the silicon wafer may be dispensed by air pressure or by piston dispense on or about a central portion of the silicon wafer.

Exposure to liquid compression molding conditions, such as at a temperature of about 110° C. to 150° C. for a period of time of about 5 minutes to 10 minutes, follows. See e.g. FIG. 1. After such exposure, the compression molded silicon wafer may be placed into a conventional oven for a post mold cure at a temperature about 120° C. to 150° C. for a period of time of about 1 to 2 hours. Desirably, a 12", 50 um thick silicon wafer should demonstrate warpage about less than 1 mm, after post mold cure, or for 8" silicon wafers, less than 0.5 mm bow across of the wafer.

A control sample (Sample No. 1) prepared from bisphenol-F epoxy, without a (meth)acrylate-functional polymer component and an oxidant, and a cationic catalyst as the cure component.

In contrast, compositions in accordance with the present invention include a curable resin matrix (such as an epoxy resin component and a (meth)acrylate-functional polymer component), a cationic catalyst as the cure component, and an oxidant.

More specifically, reference to Table 1 shows five compositions, formulated with the noted components in the stated amounts.

TABLE 1

| Type | Components Identity | Sample Nos./Amt (wt %) | | | | |
|---|---|---|---|---|---|---|
| | | 1 | 2 | 3 | 4 | 5 |
| Curable resin | Bisphenol F epoxy | 97.85 | 86.36 | 64.66 | 75.30 | 86.36 |
| | CN303 (Polybutadiene-dimethacrylate) | | 9.60 | 27.71 | 18.83 | 9.60 |
| | Methacryloxypropyl-trimethoxysilane | | 1.91 | 5.54 | 3.76 | 1.91 |
| Cationic Catalyst | UVacure 1600 (Phenyl-p-octyloxyphenyl-iodonium hexafluorantimonate) | 1.96 | 1.73 | 1.29 | 1.51 | 1.73 |
| Oxidant | Trigonox 121 (tert-Amyl peroxy-2-ethylhexanoate) | | | | 0.67 | 0.45 | 0.23 |
| | Dicumyl peroxide | | 0.23 | | | |
| Catalyst | CuAcAc (Copper (II) Acetyl Acetonate) | 0.2 | 0.17 | 0.13 | 0.15 | 0.17 |

To make a liquid compression molding material based on the above resin systems, the compositions can each be prepared by mixing together the epoxy constituents with a mechanical mixer until dissolution to a homogeneous solution was observed. The silica filler was then added with continued mixing for a period of time of about 30-60 minutes at room temperature until a viscous paste with a substantially uniform consistency was achieved. The remaining constituents were then mixed into the various samples, to form pastes, which were then transferred into containers until ready for use.

Reference to Table 2 below shows certain physical properties observed before and after cure. And specifically, mechanical properties of the noted samples such as modulus, and glass transition temperature ("Tg")] were measured after the samples were cured for a period of time of 1 hour at a temperature of 150° C. in an oven.

TABLE 2

| Physical Properties | Sample Nos. | | | | |
|---|---|---|---|---|---|
| | 1 | 2 | 3 | 4 | 5 |
| DMA Tg, tanδ (° C.) | 142 | −69,135 | −63,128 | −69,135 | −64,144 |
| DMA storage modulus @ −65° C. (MPa) | 3,253 | 3,025 | 2,090 | 1,813 | 1,335 |
| @ 25° C. | 2,625 | 2,152 | 1,153 | 1,347 | 972 |
| @ 100° C. | 1,676 | 1,214 | 691 | 932 | 846 |
| @ 150° C. | 145 | 80 | 40 | 56 | 84 |
| @ 200° C. | 79 | 65 | 41 | 52 | 64 |
| @ 250° C. | 85 | 71 | 50 | 62 | 70 |

The thermosetting resin compositions are dispensed onto and about the center of a silicon wafer. After compression molding at a temperature of 110° C. to 150° C. for a period of time of 5 minutes to 10 minutes, the composition is observed to be about 70 to 80% cured, though with a tack free surface. Then, the so-molded wafer is placed into a conventional oven for post mold cure at a temperature of 120° C. to 150° C. for a period of time of 1 to 2 hours.

To achieve high Tg and low warpage on flip chip semiconductor packaging, low temperature curing conditions (below 130° C.), with compositions that exhibit fast gellation after exposure to such low temperature curing conditions have been shown to influence warpage. The Tg of the cured composition should be equal to or higher than the temperature used to cure the composition; the Tg should be higher than 90° C., desirably above 125° C. If the composition cures slowly or at a higher temperature, the stress free point between the die and substrate set is high. Warpage at room temperature results from cooling the compression molded semiconductor package to room temperature from the cure temperature.

To achieve high reliability for thermal cycle performance between −55° C. to 125° C. of such compression molded semiconductor packages, the underfill material should have Tg by TMA after reflow at 260° C. above 90° C. and desirably above 125° C., a DSC peak below 140° C., a delta temperature between the onset and the peak on DSC below 20° C.

The physical properties [such as modulus and Tg] of one control composition—Sample No. 1-were compared against the compositions of this invention—Sample Nos. 2, 3, 4, and 5. In general, one can see the modulus ranges of Sample Nos. 2 to 5 are lower than that compared to the modulus range of Sample No. 1, and they all showed two Tg peaks while Sample No. 1 only showed one Tg transition. This combination of low modulus and multiple Tgs is a significant physical property combination for electronic materials, such as sealants, for use in encapsulating silicon wafers for microelectronic devices.

What is claimed is:

1. A liquid compression molding curable resin composition, comprising a curable resin matrix, a cure component comprising a cationic catalyst and an oxidant, wherein when cured the composition exhibits a DSC peak below 140° C. and a delta temperature between the onset temperature and the peak on DSC below 20° C.

2. The composition of claim 1, wherein when cured the composition exhibits a modulus in the range of about 2,200 MPas or less at 25° C. and multiple Tgs.

3. The composition of claim 2, wherein the multiple Tgs include a $T_{g1}$ of about −70° C. to −30° C. and a $T_{g2}$ of about 100° C. to 150° C.

4. The composition of claim 1, wherein the curable resin comprises an epoxy resin component and a (meth)acrylate functional polymer component.

5. The composition of claim 4, wherein the curable resin further comprises an episulfide resin component, an oxazine component, an oxazoline component, a cyanate ester component, and/or a maleimide-, a nadimide- or an itaconimide-containing component.

6. The composition of claim 1, wherein the curable resin further comprises an episulfide resin component, an oxazine component, an oxazoline component, a cyanate ester component, and/or a nadimide- or an itaconimide-containing component.

7. The composition of claim 1, wherein when cured the composition exhibits a Tg higher than 90° C.

8. The composition of claim 7, wherein when cured the composition exhibits a Tg higher than 125° C.

9. The composition of claim 1, wherein when cured the composition exhibits a DMA storage modulus of less than 3,253 MPa at −65° C.

10. The composition of claim 1, wherein when cured the composition exhibits a DMA storage modulus of less than 2,625 MPs at 25° C.

11. The composition of claim 1, wherein when cured the composition exhibits a DMA storage modulus of less than 1,676 MPa at 100° C.

12. The composition of claim 1, wherein when cured the composition exhibits a DMA storage modulus of less than 145 MPa at 150° C.

13. The composition of claim 1, wherein when cured the composition exhibits a DMA storage modulus of less than 79 MPa at 200° C.

14. The composition of claim 1, wherein when cured the composition exhibits a DMA storage modulus of less than 85 MPa at 250° C.

* * * * *